United States Patent [19]
Paul et al.

[11] Patent Number: 5,410,998
[45] Date of Patent: May 2, 1995

[54] CONTINUOUS EXTERNAL HEAT ENGINE

[76] Inventors: Marius A. Paul; Ana Paul, both of 20410 Via Canarias, Yorba Linda, Calif. 92686

[21] Appl. No.: 7,504

[22] Filed: Jan. 22, 1993

Related U.S. Application Data

[63] Continuation of Ser. No. 872,961, Apr. 22, 1992, which is a continuation-in-part of Ser. No. 704,293, May 21, 1991, Pat. No. 5,165,238.

[51] Int. Cl.$^6$ .................. F04C 18/22; F02G 1/02; F02G 1/04
[52] U.S. Cl. ..................... 123/204; 60/682; 418/61.2; 418/117; 418/159; 418/270
[58] Field of Search .................. 123/204, 228, 242; 418/61.2, 159

[56] References Cited

U.S. PATENT DOCUMENTS

| | | | |
|---|---|---|---|
| 2,991,930 | 7/1961 | Lindner | 418/159 |
| 3,393,666 | 7/1968 | Yamamoto et al. | 123/242 |
| 3,426,525 | 2/1969 | Rubin | 418/61.2 X |
| 4,040,392 | 8/1977 | Woodier | 123/242 |
| 4,760,701 | 8/1988 | David | 418/61.2 X |

FOREIGN PATENT DOCUMENTS

| | | | |
|---|---|---|---|
| 52-3906 | 1/1977 | Japan | 123/204 |
| 8602238 | 11/1987 | Netherlands | 123/204 |
| 1392190 | 4/1975 | United Kingdom | 123/204 |
| WO86/06437 | 11/1986 | WIPO | 123/204 |

*Primary Examiner*—Michael Koczo
*Attorney, Agent, or Firm*—Bielen, Peterson & Lampe

[57] ABSTRACT

A thermal engine utilizing a positive displacement rotary expander and preferably a positive displacement rotary compressor in conjunction with an external substantially steady-state thermal source, such as a continuous fuel combustor, the external source heating a high pressure gas that is directed from the thermal source to the rotary expander wherein the gases expand driving a rotor in the positive displacement rotary engine before discharge. An additional embodiment of the thermal engine includes a modified epitrochoidal chamber configuration for the compression cycle and the expansion cycle to utilize the total internal volume for each compression pulse and expansion pulse for obtaining improved thermal efficiency in a manner similar to super long stroke reciprocal piston engines.

8 Claims, 11 Drawing Sheets

FIG_24

CONTINUOUS EXTERNAL HEAT ENGINE

BACKGROUND OF THE INVENTION

This application is a continuation-in-part of our application Ser. No. 07/872,961, filed Apr. 22, 1992, which is a continuation-in-part of Ser. No. 07/704,293, filed 21 May 1991 now U.S. Pat. No. 5,165,238, issued Nov. 24, 1992.

This invention relates to a new category of thermal engine in which an external source of thermal energy supplies the working medium for a thermal cycle. The thermal cycle can be an open cycle in which the medium is exhausted and discharged from the engine or a closed cycle. In general, the state-of-the-art of external combustion engines, including rotary engines, is characterized by an intermittent cyclic heat release by periodic combustion within high-pressure chambers. Combustion is generally either spark ignited in the case of gasoline engines, or auto ignited in the case of high-pressured diesel engines in which fuel is periodically injected into the combustion chambers. These engines, whether utilizing reciprocal pistons or rotary pistons have certain limitations in providing efficient combustion and low pollution emission. Because of the periodic nature of combustion there are severe pressure limitations on the structure of the engine, and low power density and low thermal efficiency that results from the inability to have full and complete combustion within the extremely brief combustion phase of the operating cycle. Furthermore, fuel quality must be closely controlled to insure consistent operation. The use of high octane and cetane fuels to inhibit premature detonation and control the burning process in modern engines contributes to the release of exotic pollution emissions.

In addition, internal combustion engines that are of a gas turbine design are efficiently operable only within a narrow range of rotations and loads. Inefficiently high fuel consumptions must be maintained under partial load conditions to prevent a reduction in temperature and driving pressure with a resulting reduction in the level of rotation. This results in a drop of the pressure ratio and effects a substantial loss in efficiency. Furthermore, the very structure of a gas turbine engine is complex and expensive to fabricate, utilizing exotic materials and assemblies. This limits the use of such engines primarily to aircraft.

A primary object of this invention is to devise an engine that can utilize a relatively steady state, external thermal source to continuously generate a high-pressure, high-temperature motive gas to drive an engine and produce mechanical power for use in transportation or electrical energy production. Such an external heat engine can thereby utilize a variety of different sources of heat and grades of fuel to directly produce the motive gases. By the use of suitable heat exchange devices a variety of sources can heat a select motive gas to the temperatures and pressures necessary to endlessly supply the engine with its driving medium.

Furthermore, another object of this invention is to devise a rotary engine with a super long effective stroke to develop a compression or expansion pulse that maximizes the use of new epitrochoidal, positive displacement chamber designs with rotary pistons. The compression and expansion ratios that result are designed for thermal efficiency maximization and high power density, working continuously at a constant pressure ratio for flat minimum fuel consumption. The design utilizes modified epitrochoidal chambers that unite the two lobed cell in the bifurcated engine into a single extended chamber.

The engine is a universal fuel acceptant and universal heat converter. Since the engine uses a constant heat source, the engine can be designed as a virtually non polluting power system.

SUMMARY OF THE INVENTION

In its preferred embodiments the engine comprises a modified Wankel-type, positive displacement, rotary engine that is an efficient means for producing a rotary output. In one additional embodiment, the engine comprises a Wankel-type, positive displacement rotary engine with a modified chamber design to enable a super-long, cycle sweep of the rotor to effect an efficiency in rotary engines equivalent to super-long stroke piston engines.

The design of the engine with a substantially steady-state external heat source enables the engine to be used with a variety of thermal generating means such as an external combustion chamber, waste heat exchangers, nuclear reactors, solar heat concentrators, or any type of thermal energy source that develops sufficient heat to be applied to an expandable gas that can be used as a driving or motive gas in a suitably designed rotary engine. The expandable gas if desired or required can be cycled in a closed system or, in the case of a simple combustion gas or ordinary air can be vented to the atmosphere. The principle advantage to this type of engine is that in combustion sources, the combustion can be closely controlled to maximize efficiency and minimize pollution, or, where the thermal source is other than that generated by a combustion process, nontraditional, usually steady-state thermal sources that inherently do not contribute to air pollution can be effectively utilized to power the subject engine.

In one preferred embodiment of this invention, a Wankel-type, rotary-piston, expander is designed with a positive, variable-displacement rotary expander that enables close control of the operating conditions of the engine with relation to thermal input and mechanical output. Heretofore, continuous combustion engines using a continuous thermal source are characteristically nonresponsive to the changes in output demands, resulting in overpowering and excess fuel consumption.

In another preferred embodiment of this invention, a new type, rotary-piston, compressor and expander is designed with a positive, super-long, variable-displacement rotor and chamber configuration that enables close control of the operating conditions of the engine with relation to thermal input and mechanical output. The successive evolution of prolonged expansion of the motive gas during the enhanced angular sweep of the rotary piston enables volumetric displacement not possible in a conventional Wankel-type rotary engine configurations.

The "super long stroke" combined chamber, variable displacement rotary device eliminates the principal defect of the conventional Wankel rotary engine, which is characterized by poor efficiency resulting from a very low compression and expansion ratio.

The engines of the various embodiments are permitted to operate at maximum or optimum pressure at all loads including part loads by variations in actual volumetric displacement under constant compression and expansion ratios, resulting in conserving the thermal efficiency, and, in the cases where fuel is utilized, resulting in a flat specific fuel consumption. The system is controlled by a central processor module which includes a system of sensors to sense operating conditions and optimize all parameters of rotation, load, pressure, temperature, and relative speed of rotary compression and expansion units, with the added control of the effective displacement of the engine and compressor.

The resulting system is ideal for use in hybrid vehicles where auxiliary power sources, often electrical, are combined with the thermal system to propel the vehicle. The system is also ideal for use in power generation systems where continuous operation is desired with moderate or modulated fluctuation in load.

DESCRIPTION OF THE PREFERRED EMBODIMENTS

Figure 1:
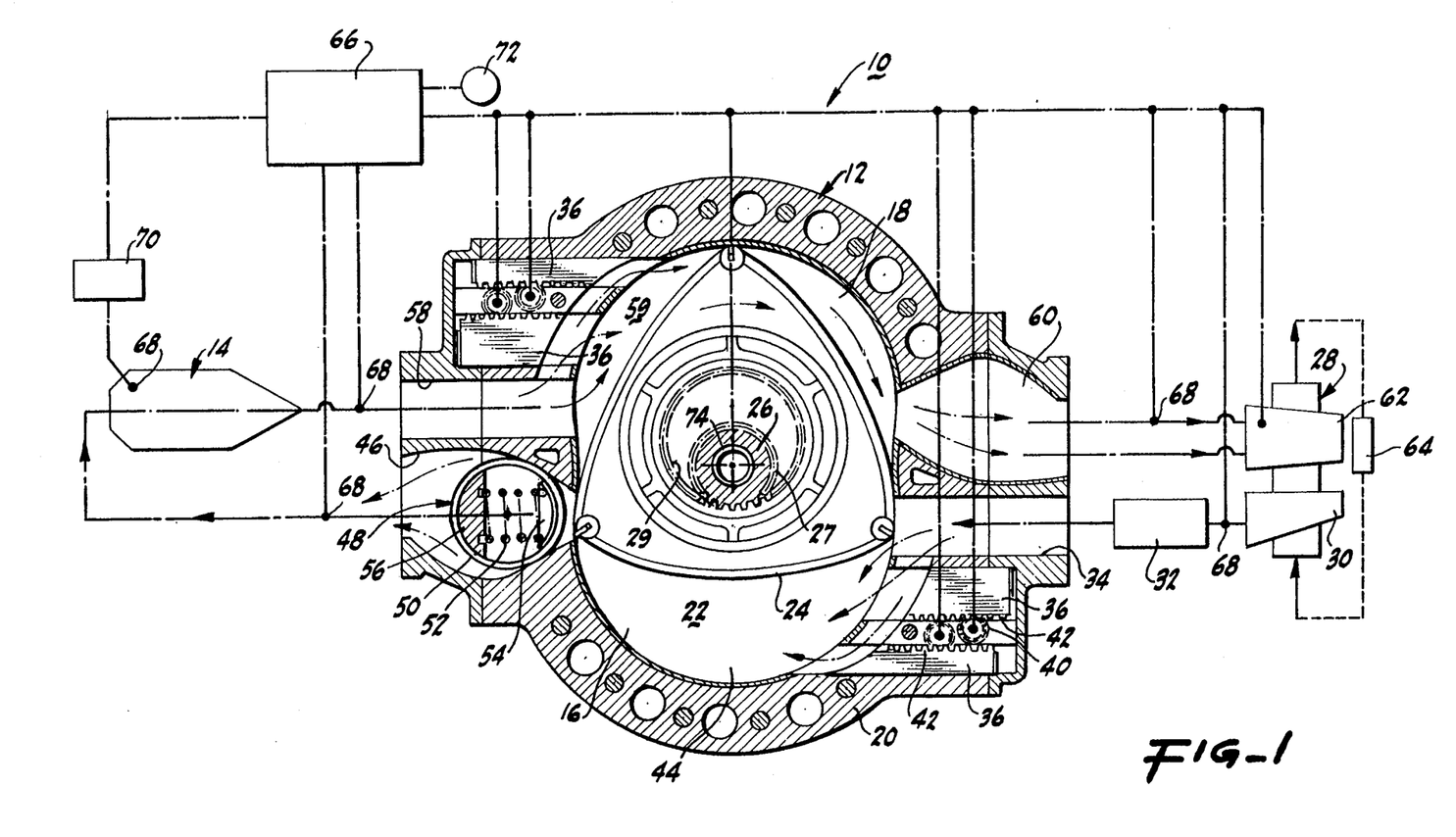
FIG. 1 is a schematic view, partially in cross-section, showing a single rotor unit with a combined expander and compressor cycle.
Figure 2:
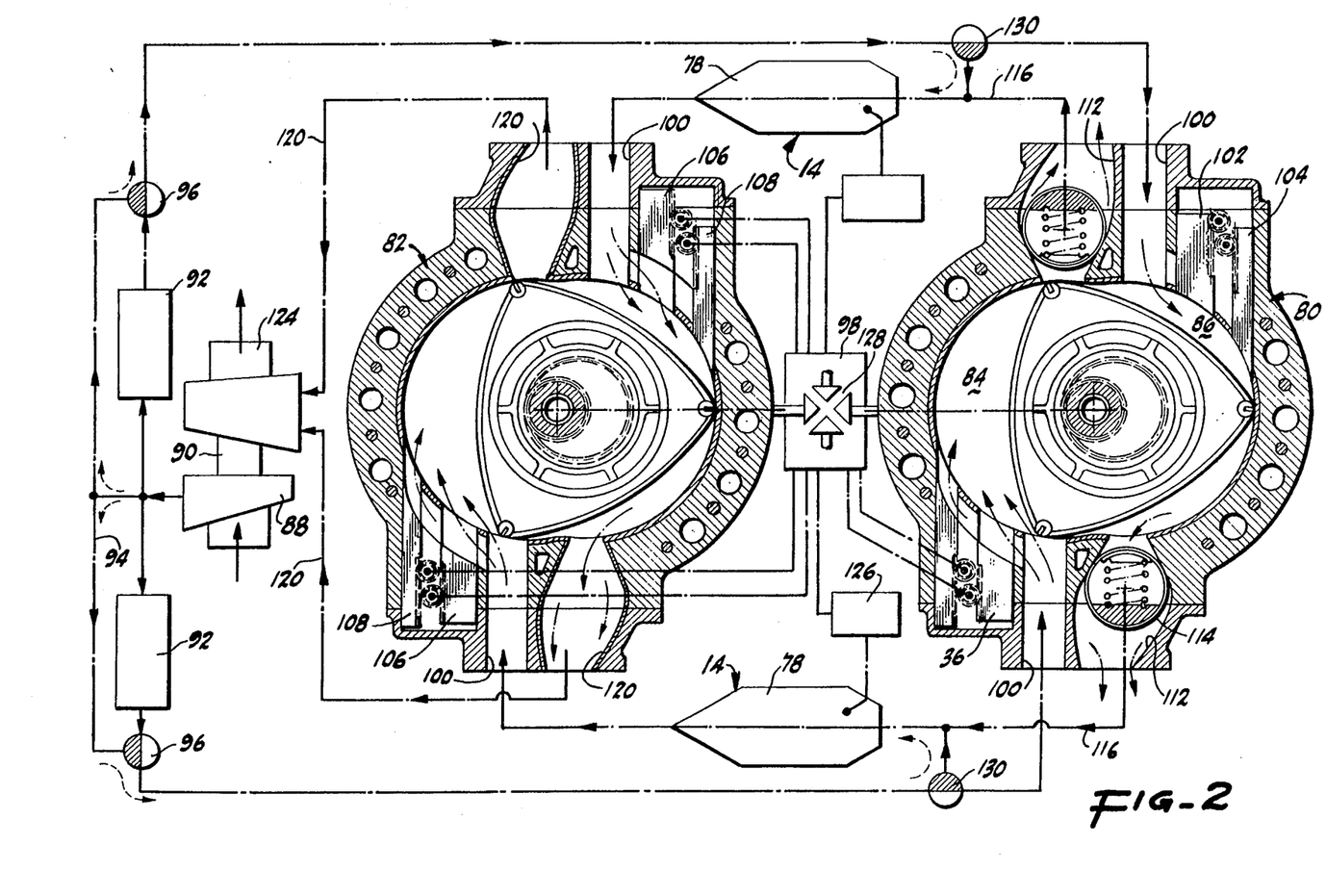
FIG. 2 is a schematic view, partially in cross-section, of a double rotor unit connected in tandum with one of the units comprising a dual compressor and the other unit comprising a dual expander.

Referring to FIGS. 1 and 2, an engine system having an external thermal source is shown. In the embodiments shown, the external thermal source is a continuous fuel combustor, however, it is to be understood that the system is operable with thermal sources that do not result in any combustion gases, such as geothermal, nuclear, and solar sources. As a variety of additional components are customarily utilized for the external thermal sources, the selected combustors are shown only schematically in order to adequately describe the focus of the invention.

The thermal engines of this invention utilize new configurations of variable-displacement, rotary engines in various combinations. The engines are optimized and controlled by a central processor which monitors the engine operating parameters and adjusts the engine controls to achieve a maximum, thermal-constant efficiency, with a minimum constant-flat-specific fuel or energy consumption. The central processor is of a type that is being currently applied to internal combustion automotive engines and is described only generally herein.

Referring to FIG. 1, the external heat engine is designated generally by the reference numeral 10. The heat engine 10 utilizes a single Wankel-type rotary unit 12 in combination with an external, substantially steady-state, thermal source 14, which in the embodiment in FIG. 1 is a continuous fuel combustor. It is to be understood that the thermal source 14 can be any high temperature source of thermal energy that can be transferred to a gas stream for use as a motive medium for the rotary unit 12. In the preferred embodiment the heat engine 10 utilizes both a compressor and an expander in the form of a compressor side 16 and an expander side 18 of the rotary unit 12.

As shown in FIG. 1, the rotary unit 12 has an external housing 20 having an epitroichoidal chamber 22 and a triangular rotor 24. The rotor 24 rotates in the chamber 22 on a central shaft 26. External gears 27 in housing 20 engage the internal gears 29 of the rotor 24 in conventional fashion. The shaft 26 is rotatably mounted in the housing 20 and provides the output means for mechanical work. In the preferred embodiment, a turbocharger 28 receives an intake gas to a compressor section 30 where the gas, in this example, air, is compressed and passed through an intercooler 32 before entering the intake port 34 of the compressor side 16 of the rotary unit. The effective volume of the air that is compressed by the compression side 16 of the rotary unit 12 is determined by the position of displaceable control plugs 36 which are linearly displaced by electronically motored pinions 40 which engage racks 42 on each control plug to selectively and discretely advance or retract each plug and effectively alter the degree of bypass that air can take as it enters the compression side of the rotary unit. In this manner the staged change in the volumetric displacement can be deliberately effected by a controller. As the rotor 24 of the unit 12 advances with a defined charge and diminishes the volume of the compressor chamber 44 the air is compressed and eventually exits through outlet or exit port 46 upon exposure of the port and upon displacement of a spring loaded outlet valve 48. The outlet valve 48 protects the compression chamber 44 from back flow of exhausted gases. The outlet valve 48 is cylindrical in configuration with a shell 50 containing a compression spring 52. The spring operates against a stationary post 56 and against a seat 54 on the inside of the shell 50.

As shown schematically, the compressed gases enter a thermal source 14 which may be a combustor that contributes products of combustion to the gas stream, or may be a thermal source that only adds heat to the compressed gas. The heated gas then enters the expander through intake port 58 having adjustable control plugs 36 which are similar to the control plugs for the compressor chamber 22. The expander chamber 59 receives the motive gases, which force the rotor 24 to rotate as the chamber enlarges. As the rotor rotates the gases are permitted to pass through a gradually exposed exhaust port 60 where they are delivered to a turbine side 62 of the turbocharger 28. The cooled and expanded gases are then either exhausted to the atmosphere or collected in an expansion chamber 64 which allows the gases to reach substantially ambient conditions before being resupplied to the compression side 30 of the turbocharger 28.

A computer processor 66 monitors and controls, and has a series of pressure/temperature sensors 68 electronically connected to the processor 66 to sense operating pressures and temperatures in the system for regulating the relatively steady-state heat source 14 by a heat control device 70, if necessary, in response to a demand input sensor 72 and output shaft sensor 74. Similarly, in response to processed signals by the central processor 66 the control plugs 36 each can be variably regulated to adjust the operating conditions of the unit in accordance with load and demand.

With reference to FIG. 2, a similar arrangement of this invention is provided with an external heat source that is a continuous combustor. Referring to FIG. 2, the heat engine 10 is constructed with two rotary units 80 and 82, here shown connected to a thermal source 14, shown as two combustor units 78 for schematic clarity. It is to be understood that the thermal source can be a single source of thermal energy that is to be transferred to the working gas in a manner similar to that described with reference to FIG. 1. In the FIG. 2 arrangement, one rotary unit 80 is dedicated to gas compression and the other unit 82 is dedicated to gas expansion. The gas compression unit 80 has a housing 83 with a bifurcated compression chamber 84 and 86 such that each side of the rotary unit compresses a stream of gas, preferably air, that is delivered from the compression side 88 of a turbocharger 90 through supercoolers 92 provided with bypass passages 94 regulated by bypass valves 96.

As in the previous embodiment, a central processor 98 has a series of sensors (not shown) to sense the operating conditions of the engine in order to optimize and regulate the engine operation as described with reference to FIG. 1. The central processor 98 operates the intake control plugs 102, 104 associated with each side of the compressor unit 80 and the intake control plugs 106, 108 of the expander.

Figure 3:
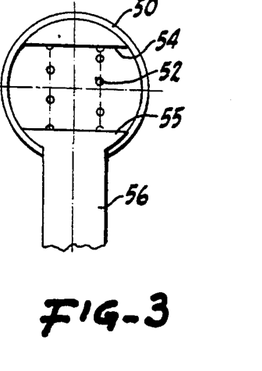
FIG. 3 is an enlarged end view of the spring operated valve used in the engine of FIG. 1 and 2.
Figure 4:
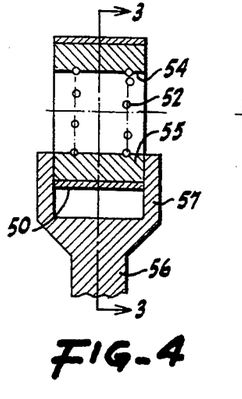
FIG. 4 is a cross-sectional view taken on the lines 3—3 of FIG. 3.

The intake control plugs 102, 104 effectively alter the size of the intake ports 100 and the volumetric displacement of the compressor and are adjusted according to load and demand. As the compressor rotor 110 exposes the exit ports 112 of the compressor unit 80, the compressed motive gas actuates the spring loaded valves 114 and is conducted via conducts 116 to the combustor units 78. The motive gas is heated and continues to the intake ports 118 of the expander unit 82. The spring loaded valves 114 are shown in detail in FIGS. 3 and 4. The valve similar to that shown with reference to FIG. 1 having a cylindrical shell 50 having a compression spring 52 with a seat 54 fixed to the shell 50 for one end of the spring and a seat 55 on a post 56 having a fork 57 to allow displacement of the valve. The valve 114 is held in place in the exit ports by the spring until displaced by force of the compressed motive gas. The valve prevents any backflow into the compressor.

In a manner similar to that described with respect to the embodiment of FIG. 1, the control plugs 106, 108 of the expander 82, enable variance of the volumetric displacement of the unit. The motive gases exit to the exit ports 120 before being conducted by conduits 122 to the turbine side 124 of the turbocompressor.

The central processor 98 monitors and controls the operation of the engine including a modulator 126 for the heat source and a variable transmission and clutch unit 128 for either varying the rotational ratio of the interconnected units 80, 82 or separating the units and bypassing the motive gas through flow control valves 130.

To improve the effective operation of the rotary units at maximum pressure for the construction and materials selected for a particular operating environment, improved apex seals are provided.

Figure 5:
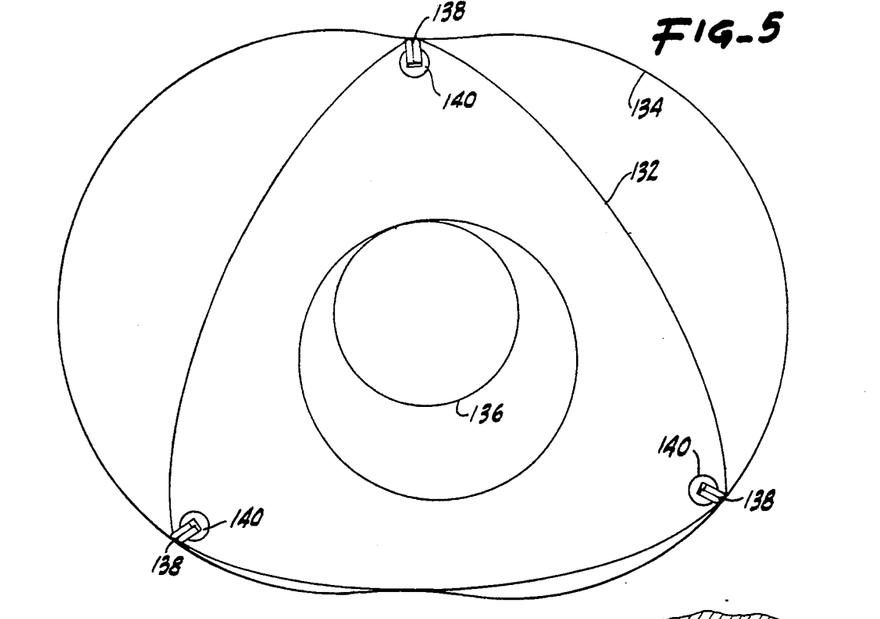
FIG. 5 is a diagrammatic view of a rotary piston and epitrochoidal chamber with apex seals.
Figure 6:
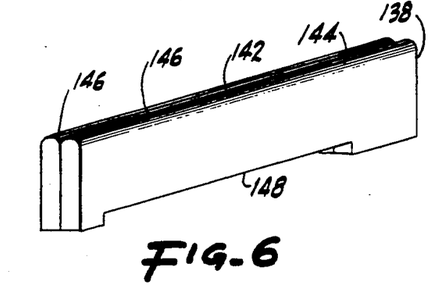
FIG. 6 is a prespective view of the apex seals.
Figure 7:
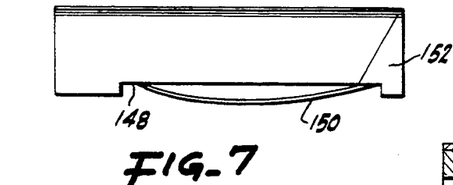
FIG. 7 is a side elevational view of one of the seal members.
Figure 8:
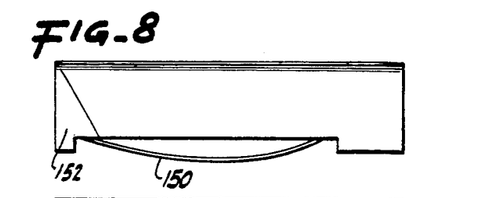
FIG. 8 is a side elevation of the other seal member.
Figure 10:
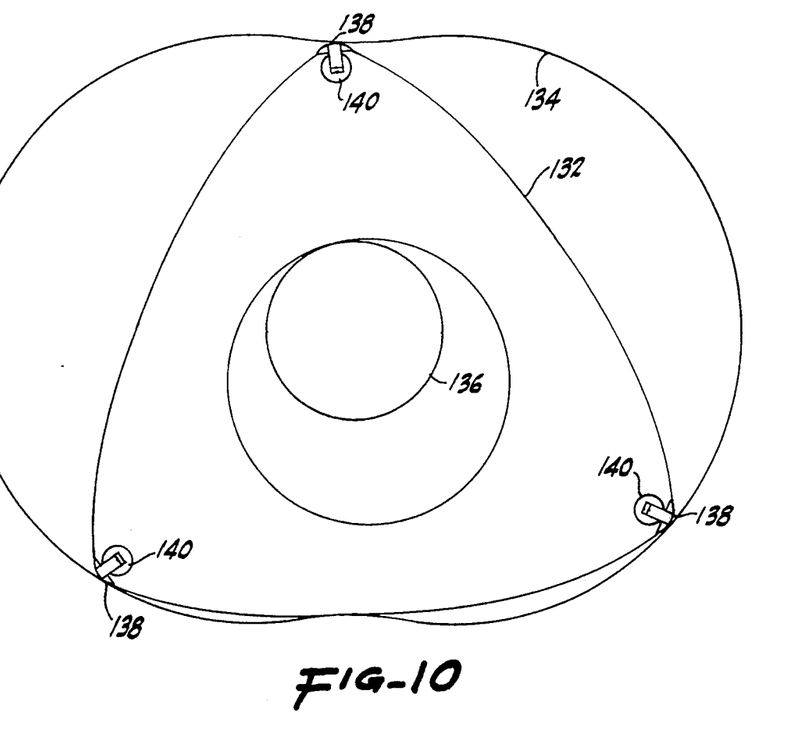
FIG. 10 is an enlarged alternate view of a rotary piston and epitrochoidal chamber with apex seals.
Figure 14:
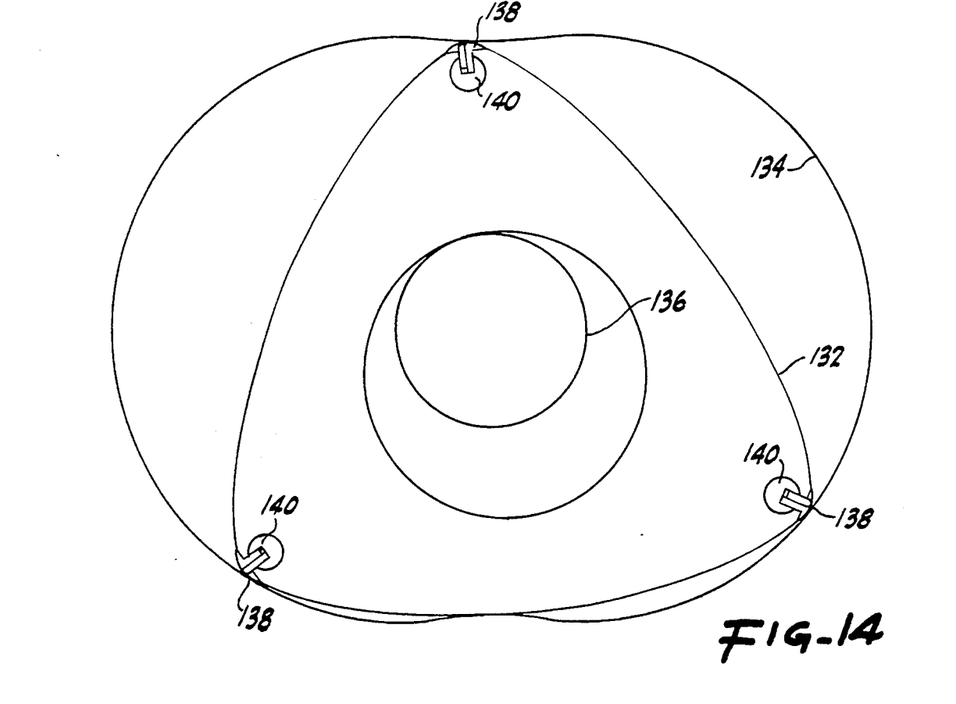
FIG. 14 is a diagrammatic view of an alternate embodiment rotary piston and epitrochoidal chamber with apex seals.

Referring to the schematic illustrations of FIGS. 5, 10 and 14, a rotor 132 mounted eccentrically in an epitrochoidal chamber 134 in geared engagement with a housing mounted external gear 136 has apex seals 138 in retainers 140 at the apex of the triangularly shaped rotor. These embodiments of the apex seals are described for alternative use in the engines of FIG. 1 and FIG. 2.

Referring to FIGS. 6-9 a double seal with a first member 142 and a second member 144 are shown with an arcuate top surface 146 and a recessed bottom 148 for installation of a leaf spring 150 to urge the seals toward the chamber during operation.

Figure 9:
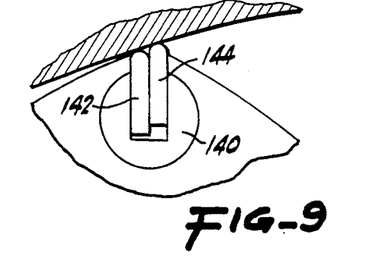
FIG. 9 is an enlarged end view of the seals in an inset.

The double floating seal members 142, 144 can adjust to the chamber independently as shown in FIG. 9. The seals trap a bead of oil between seal members to further improve the double sealing action of the displaceable members. A wedge-shaped end segment 152 at remote opposed ends of each member 142,144 together with the spring action produces an axial/radial expansion effect to aide in sealing the ends of the apex seal members as well as the gliding tops.

Figure 11:
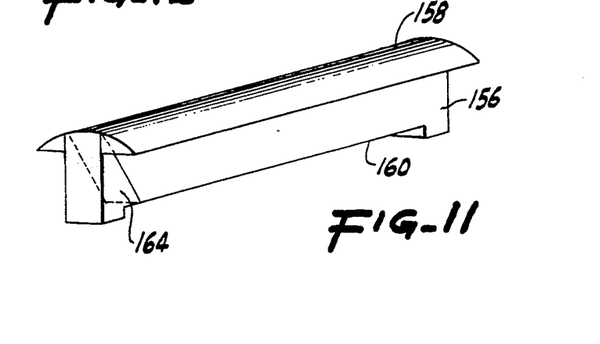
FIG. 11 is a prespective view of one of the end seals.
Figure 12:
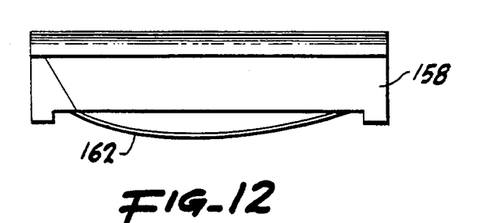
FIG. 12 is a side elevational view of the end seal of FIG. 11.
Figure 13:
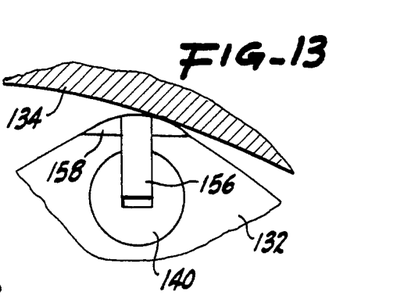
FIG. 13 is an enlarged end view of the apex seal installed in an inset.

Referring to FIGS. 11-13, a single end seal 156 has an enlarged, flatter, curved top edge 158 to promote increased contact on the relatively flat chamber wall. The seal is designed to encourage full surface contact gliding on an air or oil cushion. The seal 156 has a central body 158 with a recess 160 for installation of a leaf spring 162 to urge the seal against the wall when installed in the inset 140.

At least one end 164 of the seal 156 has the diagonal cut to enable the sections to impart a wedge action.

Referring to FIGS. 15-18 the seal shown combines the advantages of the previously described seals and is constructed with matched seal members 166, 168 with a central segment 170, 172 having arcuate tops 174, 176 with tapered overlap edges 178, 180.

Figures 15, 16, 17, 18:
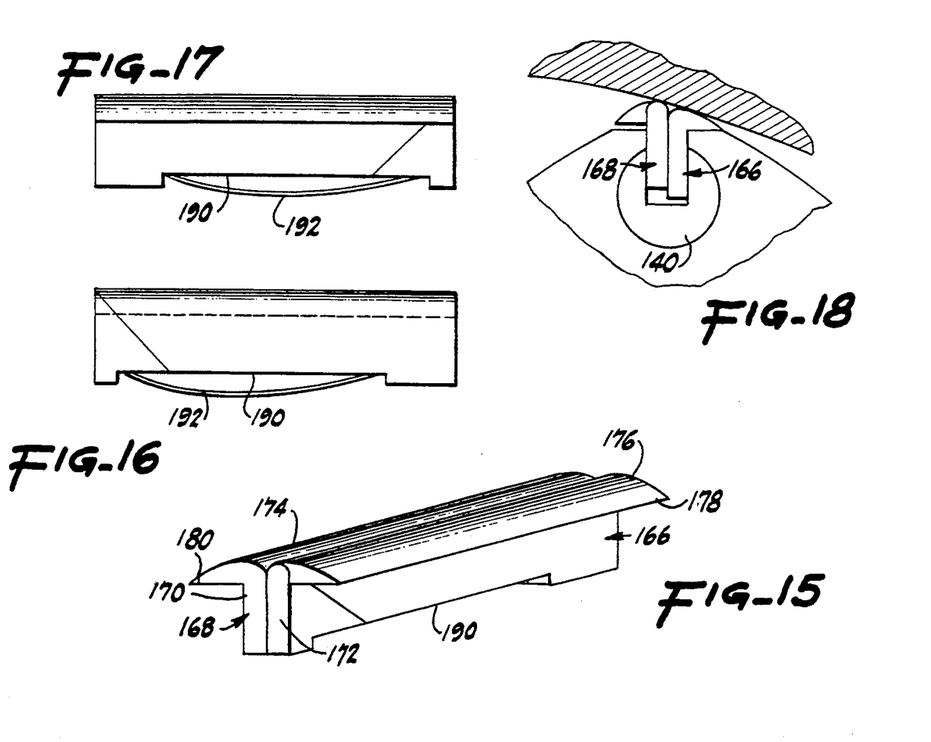
FIG. 15 is a perspective view of the combined apex seal.
FIG. 16 is a side elevational view of one of the seal members.
FIG. 17 is a side elevational view of the other seal member.
FIG. 18 is an enlarged end view of the combined seal in an inset.

An inset 190 in the bottom allows for installation of leaf springs 192 to permit independent displacement as shown in FIG. 18. As in the first embodiment, oil is trapped between seals and is carried as a further seal between sections. As in the second embodiment the tapered top permits a hydro-gaseous gliding conducive to acceptable operation at higher pressure and speeds.

The larger area of the seals distributes the forces and disperses the wear, providing a longer life for this important component in the rotary machines.

Figure 19:
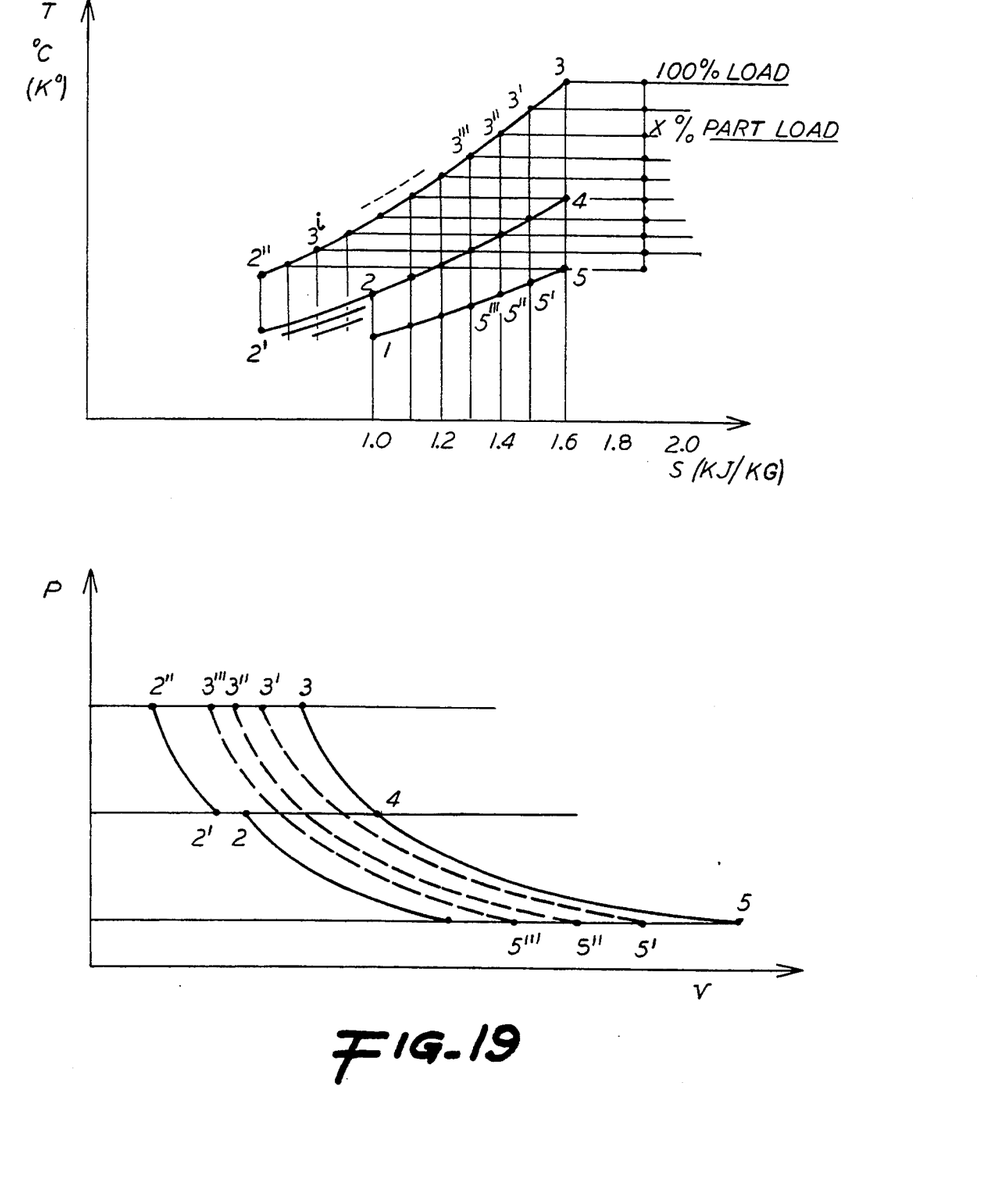
FIG. 19 is a diagrammatic view of TS-PV diagrams.

Referring to FIG. 19, a diagrammatic illustrations of TS and PV are shown to illustrate the thermodynamic operating conditions at discrete levels of partial load.

Figures 20, 20A:
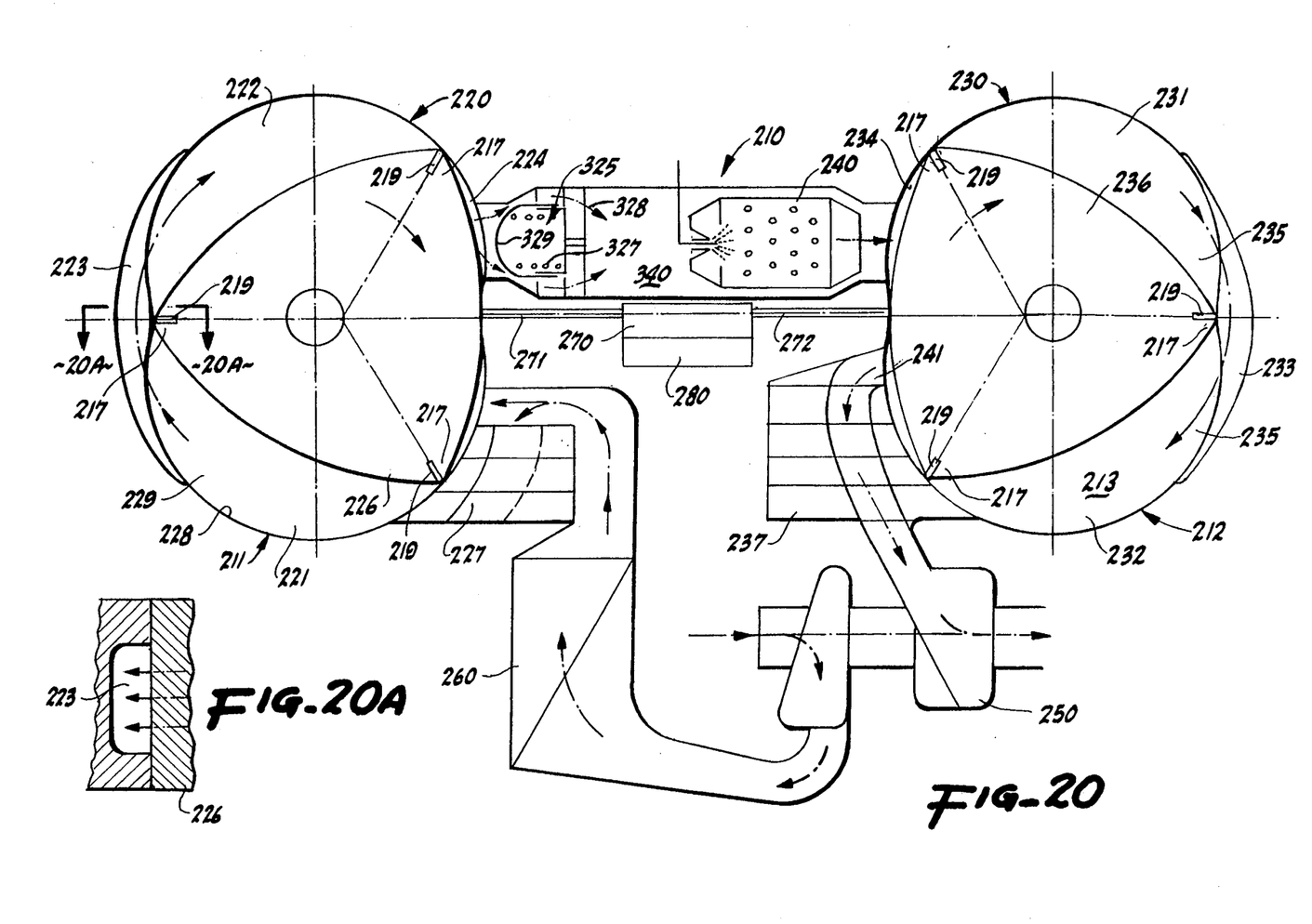
FIG. 20 is a diagrammatic illustration of an engine unit having a combined compressor component and expander component with a steady state heat source.
FIG. 20A is a cross sectional view of the interconnection channel taken on the lines 20A—20A in FIG. 20.
Figure 21:
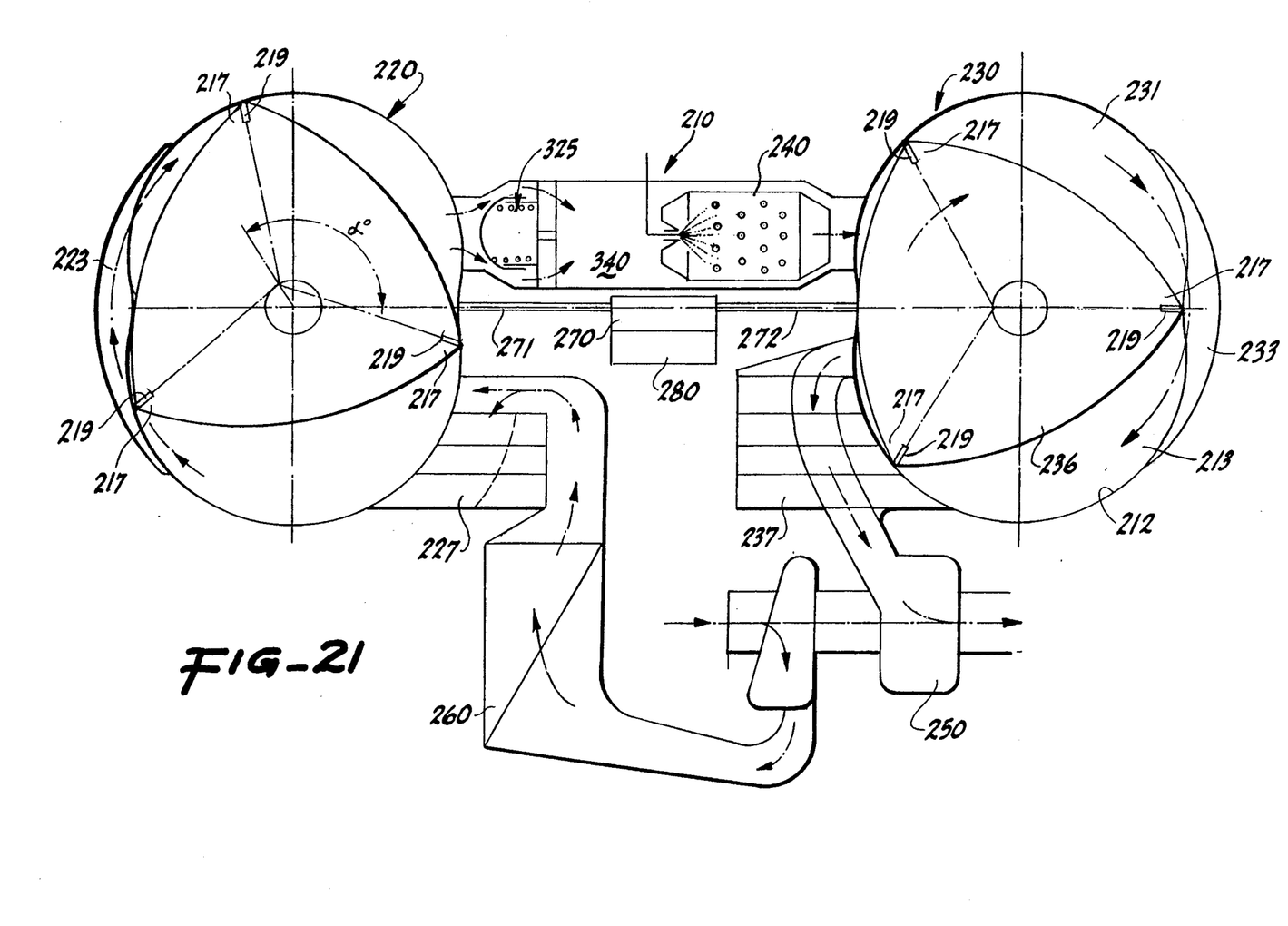
FIG. 21 is a diagrammatic illustration of the unit of FIG. 20 with an angular displacement of the compressor rotor from the expander rotor.

Referring to FIGS. 20 and 21, an alternate embodiment of an engine unit 210 is comprised essentially of a combination of a rotary compressor component 220, a rotary expander component 230, a combustor 240 (or an external heat source), a turbocharger 250, an intercooler 260, and an electronically controlled, angularly variable clutch unit 270, having an integrated electronic control unit (Ecu) 280.

The rotary compressor 220, is provided with a housing 211 having a two-lobed, epitrochoidal cavity 224 with two communicating trochoidal sections 221 and 222 divided into rotating compression chambers by a rotor 226 of generally triangular configuration having three symmetrically displaced apexes 217 with apex seals 219. The rotor 226 has a planetary rotative movement in the cavity 224 by conventional gearing of the Wankel-type engines.

Although the outline of the perimeter wall 228 forming the cavity 224 is a conventional configuration forming two lobes and a central constricted portion, a unique interconnection channel 223 on one side of the perimeter wall where the cavity 224 is constricted interconnects the two sections of the epitrochoidal cavity cells 221 to form a double size chamber 229 as the rotor 226 sweeps around the cavity on its eccentric rotation. This channel 223 generates a "super long stroke" compression by the combined successive evolution of both cavity sections 221 and 222, in one unified rotary displacement volume. The final compressed volume in the chamber 224, in FIG. 20 represents the maximum compression ratio, obtainable with this "super long compression stroke".

The rotary expander 230, is similar in construction having a housing 212 having a two-lobed epitrochoidal cavity 213 with two interconnected cavity sections 231 and 232, and an interconnection channel 233 generating a "super long stroke" expansion by the combined successive evolution of both the cavity sections 231 and 232 in one unified rotary displacement volume.

The minimized starting volume in expandable chamber 234 produces the maximum expansion ratio obtainable with a "super long expansion stroke" by evolution of the initial chamber 234 into the interconnected maximized chamber 235. Generally the combustion chamber 240 (or the external heat source) is communicating with the rotary compressor 220 through a one way check valve 225, automatically activated by the compressed air flow supplied by the compressor. The rotary piston 226 and 236 are geared in a conventional Wankel-mode, interconnected through a conventional electronically controlled, angularly variable clutch unit 270, which is designed to enable controlled variation in the angular disposition of the interconnected compressor shaft 271, and the expander shaft 272.

In FIG. 21, the clutch unit 270, interconnects the shafts 271 and 272, and provides an angular shifte $\alpha°$ of the rotary compressor, which modifies the final internal volume Vf,co of the compressor by reducing the internal compression ratio. This compression ratio is adjusted with the maximum supercharging pressure specific for maximum load operation. The result is an always, constant maximum pressure combustion, at all loads and all rations.

The angular shift $\alpha°$ between the rotary compressor and rotary expander is electronically controlled by the ECU 280, which is programmed to maintain, constant maximum pressure at all regimes of load and engine speed.

Another adjustment means for pressure ratio for both compressor and expander are the staged plugs 227 and 237. The operation of the plugs is described in connection with the embodiments of FIGS. 1 and 2.

Both rotary components, compressor and expander, have this "super long stroke" displacement, and can be considered individually separate units, for different applications. Furthermore, internal cogeneration by water/steam injection can be employed to raise the thermal efficiency over 90% eliminating totally all pollutants, including nitrogen oxides, by reducing combustion temperature under the fixation temperature of nitrogen oxidation. The engine by its nature is an universal fuel acceptant and universal heat converter.

Figure 22:
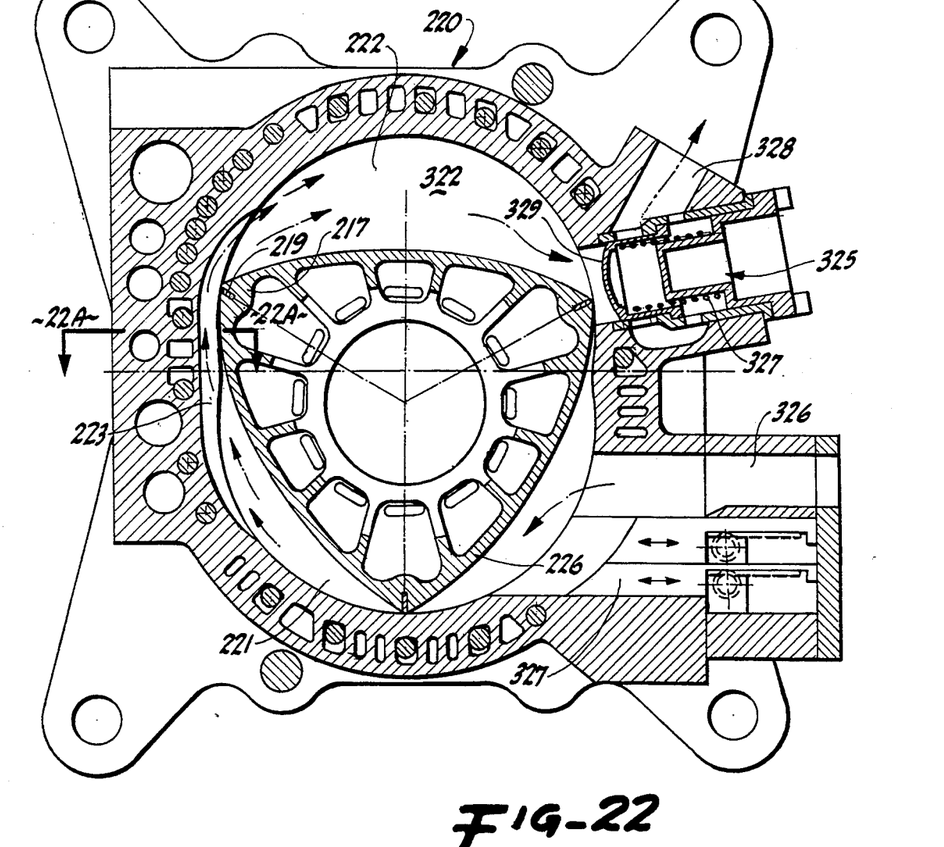
FIG. 22 is a cross sectional view of the compressor component of the unit in FIG. 21.
Figure 22A:
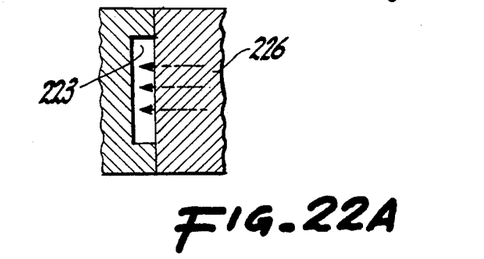
FIG. 22A is a cross sectional view of the interconnection channel taken on the lines 22A—22A in FIG. 22.

In the cross sectional view of FIG. 22, the internal configuration of the rotary compressor 220 is shown, having two trochoidal cavity sections 221 and 222, interconnected by the interconnection channel 223 producing the "super long stroke" of compression.

Figure 23:
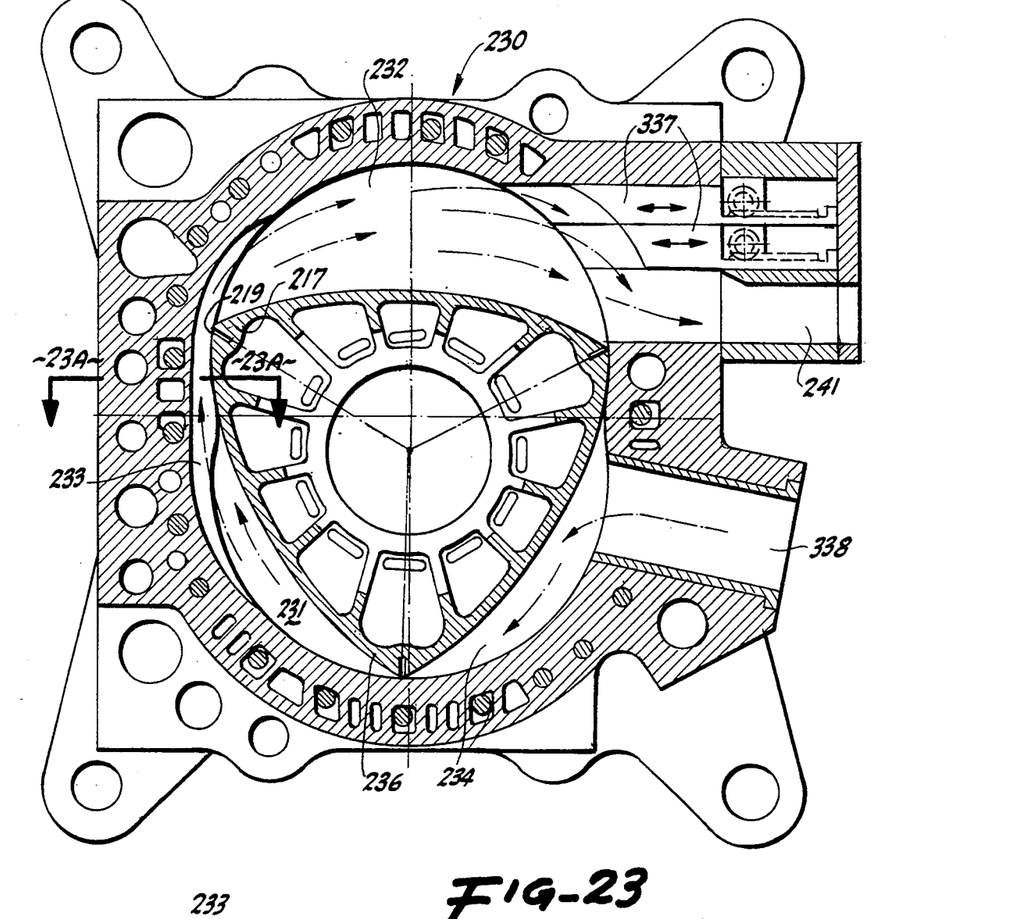
FIG. 23 is a cross sectional view of the expander component in the unit of FIG. 21.
Figure 23A:
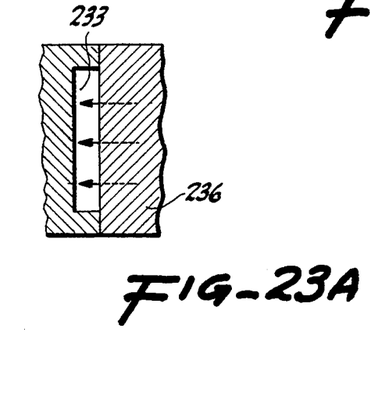
FIG. 23A is a cross sectional view of the interconnection channel taken on the lines 23A—23A in FIG. 23.

The non-return check valve 325, is constructed with a piston 329, controlled by a spring 327. The air exit 328 opens when the pressure in the compression chamber 322 exceeds the counter pressure in the combustion chamber 340. The rotary piston 226 is geared in a conventional (Wankel) way. The staged plugs 227 can adjust the beginning of the compression cycle, trapping an initial displacement that can be varied according to demand, which thereby adjusts air mass flow and the effective volumetric compression. The cross sectional view of FIG. 23 shows the internal configuration of the rotary expander 230, having two trochoidal cavity sections 231, and 232, interconnected by the interconnection channel 233, producing a "super long stroke" of expansion. The incoming motive gas is conducted through the shielded intake 338, into the chamber 234. As the rotor rotates the expanding gas reaches the bypass interconnection channel 233 and expand to further drive the rotor until the exhaust port 241 is exposed. There the exhausted, expanded gases are conducted through the port 241 as adjusted by the staged adjustable plugs 337. The adjustable plugs 337 enable adjustment of the volume to control the expansion ratio as previously described.

Figure 24:
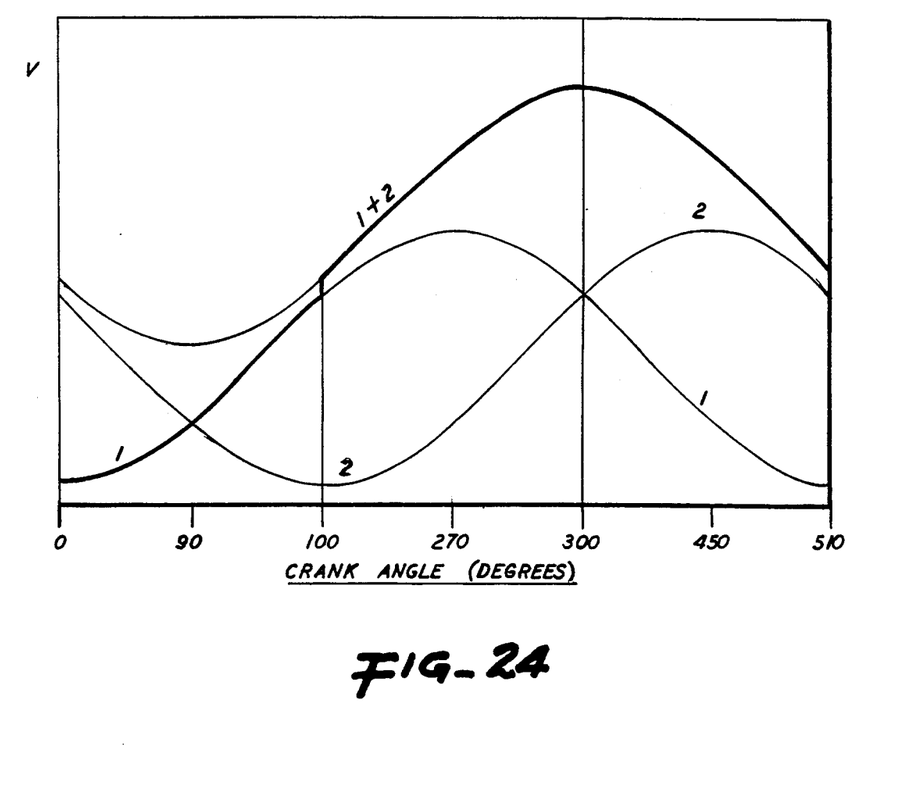
FIG. 24 is a diagrammatic illustration comparing the interconnected cell configuration.

As shown in the diagrammatic illustration of FIG. 24, the independent volumetric evolution for standard chambers 1 and 2 in a typical bifurcated Wankel-type unit is compared with the volumetric evolution for an interconnected-cavity chamber for the modified engine of this embodiment that provides the super-long angular sweep that is the rotary equivalent of the super-long stroke in reciprocal piston engines.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A Wankel-type, volumetric displacement mechanism comprising a housing having an internal, elongated, epitrochoidal cavity having two lobed cavity sections and a substantially triangular rotary piston with three symmetrically spaced apexes eccentrically rotatable in the cavity with the piston and housing forming variable volume chambers within the cavity as the piston rotates wherein the housing has a curved, perimeter wall with two opposed elongated wall segments forming opposite sides of the cavity with a first side of the elongated cavity having a first wall segment having a gas inlet and a gas outlet communicating with respective cavity sections of the cavity, and an opposite second side of the elongated cavity having a second wall segment with a central portion of the wall segment having an interconnecting channel means for allowing free and substantially unrestricted passage of gas from one cavity section to the other as delimited by the piston, wherein the channel means comprises a channel in the central portion of the wall segment on the second side of the cavity, wherein the channel has a length substantially equal to, but less than the distance between adjacent apexes of the piston, wherein an extended volumetric displacement occurs in a chamber formed in the cavity by the rotating piston and the wall of the housing.

2. The displacement mechanism of claim 1 in combination with a similar volumetric displacement mechanism each having an output shaft interconnected with an angularly adjustable clutch wherein one mechanism comprises a compressor and the other mechanism comprises an expander.

3. The displacement mechanism of claim 2 including a steady state thermal source between the compressor and the expander wherein gas is compressed by the compressor, is heated by the thermal source, and is expanded in the expander, wherein gas expanded by the expander drives the rotary piston of the expander.

4. The displacement mechanism of claim 3 wherein a conduit having a check valve interconnects the compressor and expander.

5. The displacement mechanism of claim 4 wherein the thermal source is situated in the conduit.

6. The volumetric displacement mechanism of claim 1 wherein the cavity has a central constriction and the interconnecting channel is in the housing wall at the constriction opposite the gas inlet and gas outlet.

7. The volumetric displacement mechanism of claim 6, wherein the displacement mechanism comprises a compressor with a gas inlet having means for varying the volume of gas admitted through the gas inlet for varying the degree of compression and transfer of gas to the gas outlet.

8. The volumetric displacement mechanism of claim 6, wherein the displacement mechanism comprises an expander with a gas outlet having means for varying the volume of gas released to the gas outlet.

* * * * *